United States Patent [19]
Bruhnke et al.

[11] Patent Number: 5,418,358
[45] Date of Patent: May 23, 1995

[54] CHIP CARD WITH FIELD STRENGTH DETECTOR HAVING A SWITCH AND LOAD TO LIMIT DAMPING TO THE MEASUREMENT CYCLE

[75] Inventors: Michael Bruhnke, Munich; Gerold Klötzig, Eching; Klaus Klosa; Stuart Smith, both of Munich, all of Germany

[73] Assignee: Temic Telefunken microelectronic GmbH, Heilbronn, Germany

[21] Appl. No.: 103,037

[22] Filed: Jul. 28, 1993

[30] Foreign Application Priority Data

Aug. 20, 1992 [DE] Germany .............. 42 27 551.2

[51] Int. Cl.⁶ .......................................... G06K 19/07
[52] U.S. Cl. ............................................. 235/492
[58] Field of Search .............. 235/492, 380, 438, 439; 340/825.54

[56] References Cited

U.S. PATENT DOCUMENTS

| | | | |
|---|---|---|---|
| 4,463,353 | 7/1984 | Kuzara | 340/825.54 |
| 4,546,241 | 10/1985 | Walton | 235/380 |
| 4,783,658 | 11/1988 | Nakano et al. | 340/825.34 |
| 4,797,541 | 1/1989 | Billings et al. | 235/449 |
| 4,924,171 | 5/1990 | Baba et al. | 235/493 X |
| 5,013,898 | 5/1991 | Glasspool | 235/492 X |
| 5,030,807 | 7/1991 | Landt et al. | 235/380 X |
| 5,113,184 | 5/1992 | Katayama | 235/382.5 X |

FOREIGN PATENT DOCUMENTS

| | | |
|---|---|---|
| 0496023A1 | 7/1992 | European Pat. Off. . |
| 2636188 | 3/1990 | France . |
| 2738113 | 3/1978 | Germany . |
| 3307579 | 11/1984 | Germany . |
| 2852941 | 8/1985 | Germany . |
| 3935364 | 8/1990 | Germany . |
| 4100693 | 7/1991 | Germany . |
| 4003410 | 8/1991 | Germany . |
| 0284692 | 11/1988 | Japan ......... 235/380 |
| 0060890 | 2/1992 | Japan ......... 235/492 |
| 2208025 | 2/1989 | United Kingdom . |
| 2208058 | 2/1989 | United Kingdom . |

OTHER PUBLICATIONS

Wigand, W., "Die Karte mit dem Chip Schlüssel zu einer Welt neuer Leistungen und Lösungen", Siemens-Aktienges., ISBN 3-8009-1573-1 (1991).

*Primary Examiner*—John Shepperd
*Attorney, Agent, or Firm*—Spencer, Frank & Schneider

[57] ABSTRACT

The invention relates to a contactless and batteryless chip card having an antenna coil, a transmission and reception stage which via an electromagnetic alternating field generated by a write/read unit on the one hand supplies the chip card with energy and on the other hand ensures bidirectional data transmission to the write/read unit. The chip card in accordance with the invention has a detector for determining the field strength of the electromagnetic alternating field transmitting energy to said chip card. The functions of the user part, which have a high energy requirement to implement them, are only implemented advantageously when the detector has detected a sufficient field strength. This prevents defective or incomplete implementation of energy-consuming functions of the chip card before they are begun. The field strength detector consists of a switch and load in parallel to the coil with the switch controlled by a control circuit to cause the switch to be on only during a measurement cycle. By having the switch on only during the measurement cycle damping of the coil is prevented and the range of the card is extended compared to a card where the load is always in parallel to the coil. The control circuit can also monitor the supply voltage and prevent the measurement cycle if the supply voltage drops below a predetermined value. Such interruption in the measurement cycle prevents the measurement from reducing the supply of energy to the rest of the circuits.

17 Claims, 3 Drawing Sheets

CHIP CARD WITH FIELD STRENGTH DETECTOR HAVING A SWITCH AND LOAD TO LIMIT DAMPING TO THE MEASUREMENT CYCLE

BACKGROUND OF THE INVENTION

The invention relates to a contactless and batteryless chip card having an antenna coil, a transmission and reception stage, which via an alternating field generated by a write/read unit supplies the chip with energy and insures bidirectional data transmission to the write/read unit, and a functional circuit part which is dependent on the respective application of the chip card.

Chip cards of this type are known from, for example, Winfried Wigand "Die Karte mit dem Chip", Siemens Nixdorf Informationssysteme AG, Berlin and Munich, 1991, in particular pages 34–36. In known contactless and batteryless chip cards, the current is supplied by, for example, transformer connection via an alternating field generated by an associated write/read unit. Data transmission too, from and to the chip card, is achieved by modulation of this alternating field. Certain functions of the chip card, such as the programming of EEPROM cells with data transmitted via the field to the chip card, require a higher energy quantity than other functions of the card, such as transmission and reception of data. These energy-consuming functions are only implemented defectively and incompletely when the current supply is deficient. For example, data preservation cannot be ensured during programming of the EEPROM cells of the chip card unless sufficient current is supplied to the chip card. Since the current supply of the chip card is dependent on the distance from the write/read unit and its transmission capacity besides other factors, a change in the distance between the chip card and the write/read unit may have the effect that those chip card functions requiring a higher quantity of energy for their implementation are not implemented properly.

SUMMARY OF THE INVENTION

The object underlying the invention is to provide a chip card having an antenna coil, a transmission and reception stage, which via an alternating filed generated by a write/read unit supplies the chip with energy and insures bidirectional data transmission to the write/read unit, and a functional circuit part which is dependent on the respective application of the chip card, whereby the energy quantity transmitted through the alternating field of the write/read unit can be determined.

This object is attained by a chip card having a detector for determining the field strength of the electromagnetic alternating field transmitting energy to the chip card.

In the chip card in accordance with the invention, a detector is provided for determining the received field strength of the alternating field generated by the write/read unit and supplying the chip card with energy during operation. The energy quantity transmitted through the alternating field is mainly dependent on the field strength of the alternating field received by the chip card. Detection of the received field strength permits deductions and conclusions to be made as to the energy quantity available to the chip card.

In an embodiment of the invention, functions of the user part of the chip card requiring a high energy quantity if they are to be implemented without fault are only implemented when a sufficiently high received field strength has been detected by the field strength detector. The detected received field strength must ensure a sufficient energy quantity for dependable and fault-free implementation of these functions. These energy-consuming functions of the user part include, for example, programming and writing of PROM, EPROM and EEPROM cell arrays.

In accordance with an advantageous embodiment of the invention, the detector for field strength measurement has a switch T1 and a load R1. For field strength measurement, the switch T1 is closed, so that the load R1 is switched parallel to the reception coil 1. A substantial aspect of the invention is that the load is not continuously, but only temporarily parallel to the reception coil and damps the latter. The clock-timed field strength measurement means that the full current of the reception coil is available to the transmission and reception stage for current supply during the remaining time with the load switched off. At clock-timed switch-on of the load R1, a measurement cycle signal MOD is supplied to the switch T1. Measurement of the received field strength is in time with the measurement cycle signal.

in a further advantageous embodiment of the invention, the voltage drop along the load in the field strength detector is used as a field strength-dependent potential. When the switch is closed, a current flows through the load that is proportional to the received field strength in the time average. Measurement of the voltage drop along the load R1 therefore provides a yardstick for the magnitude of the received field strength and hence also a yardstick for the energy quantity available to the chip card.

In accordance with a further embodiment of the invention, the supply voltage VSS, GND (=ground) obtained in the transmission and reception stage 2 from the alternating field is used as a field strength-dependent potential. When the switch T1 is closed, some of the current supplied by the reception coil flows via the load R1. With a low received field strength, therefore, the supply voltage VSS, GND of the chip cards obtained by the transmission and reception part from the coil current falls. Hence the supply voltage generated by the transmission and reception stage can also be used by the field strength detector to ascertain the received field strength when the switch T1 is closed. In an advantageous embodiment of the invention, the field strength-dependent potential is compared with a suitable reference voltage using a comparator circuit. The comparator circuit is supplied with the measurement cycle signal MOD in addition to the field strength-dependent potential in the reference voltage. This ensures that the field strength-dependent potential is only evaluated by the comparator circuit when load is applied, i.e. when switch T1 is closed. There is therefore a binary signal at the output of the comparator stage showing whether the received field strength has attained or overshot a preselected value. When the correct reference voltage is selected, it is indicated whether the received field strength is sufficient to implement certain functions of the user part.

In another advantageous embodiment, the field strength-dependent potential is digitized by an A/D converter and placed in interim storage in a memory latch. At the output of the memory latch the result of the field strength measurement can be read out in digital form for further processing.

In an advantageous embodiment, the measurement cycle-signal MOD is supplied to the memory latch. This limits the write access to the memory latch to that time in which the load is applied, i.e. while switch T1 is closed. The result of the field strength measurement is passed on in binary or digitized form to the transmission and reception stage. A logic stage in the transmission and reception stage then decides whether certain function groups of the user part can be implemented or not. The user part too can be supplied with the result of the field strength measurement so that this result can be further processed there.

In an advantageous embodiment of the chip card system, comprising chip card and write/read unit, the field strength measurement result obtained by the chip card is passed on to the write/read unit. The write/read unit then adjusts its transmission capacity to suit the received field strength in the chip card. The result is that a sufficient energy supply to the chip card is ensured at all times over an expanded distance between the chip card and the write/read unit, and that all functions of the user part can be implemented without the write/read unit operating continuously at an increased transmission capacity. The transmission capacity of the write/read unit is continually adjusted to the distance from the chip card.

The invention is described in detail in the following on the basis of the figures and of an embodiment.

DESCRIPTION OF THE PREFERRED EMBODIMENTS

Figure 1:
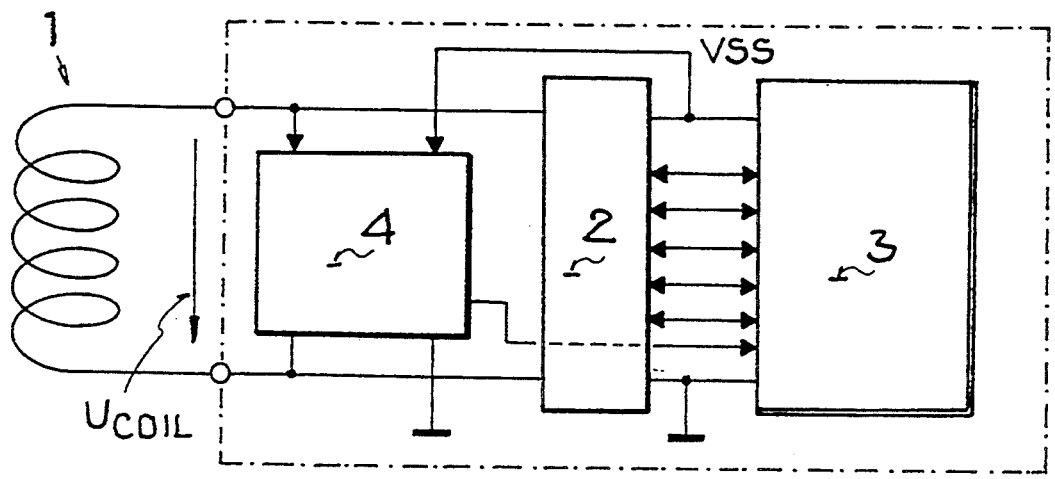
FIG. 1 shows the block diagram of a chip card in accordance with the invention.

FIG. 1 shows the block diagram of a contactless and batteryless chip card in accordance with the invention. A stationary write/read unit, not shown in the figure, generates an RF field that supplies the chip card with energy. In addition, data are exchanged between the chip card and the write/read unit via the RF field. The chip card generally has a reception antenna 1. In the embodiment, this is advantageously a reception coil. The voltage $U_{COIL}$ induced by the RF field in the coil 1 is supplied to the transmission and reception stage 2 of the chip card. The transmission and reception stage 2 obtains from the coil voltage $U_{COIL}$, on the one hand, the supply voltage VSS, GND for the chip card and on the other hand the received data $D_1 \ldots D_N$. A suitable method is described in application P 41 07 311. The received data $D_1 \ldots D_N$ are passed on, for example in digital form on the basis of a bus system, to the user part 3 of the IC card. For transmission, the RF field is modulated by damping the reception coil 1. The modulation of the RF field is received and evaluated by the write/read unit. The data to be transmitted are passed from the user part 3 to the transmission and reception stage 2, which then controls the damping of the reception coil 1. It must be ensured here that the coil is not damped too heavily, as otherwise the voltage supply of the chip card will collapse.

The user part 3 generally contains a non-volatile memory for permanent storage of the transmitted data, and further circuitry components for processing such data. To program the non-volatile memory, which is generally formed by an EEPROM array of sufficient size, a sufficiently large quantity of energy is necessary to ensure dependable programming and data preservation. In accordance with the invention, a detector 4 is provided for determining the field strength received by the reception coil of the RF field generated by the write/read unit. An evaluation logic stage permits functions such as writing into the EEPROM cells only when there is a sufficient quantity of energy on the chip card. In a first embodiment, a series circuit consisting of a first transistor T1 used as a switch and of a load R1 is provided for field strength measurement. This series circuit connects the two ends of the reception coil. When the switch is closed, the voltage drop across the load R1 is proportional to the received field strength and hence at the same time a yardstick for the energy quantity available on the chip. However, since continuous damping of the reception coil with the load R1 involves a high energy loss, and in addition the range for transmission of data would fall very steeply, damping of the coil by the load R1 is timed. For that purpose, the measurement cycle signal MOD is supplied to the transistor T1 serving as a switch.

The measurement cycle switch MOD ensures that the load R1 is periodically switched parallel to the reception coil. Furthermore, an additional control circuit REG is provided to prevent the voltage supply of the IC from collapsing when the received field strengths are very low and when the load R1 is applied. In that case, almost the entire current would flow through the load R1 with switch T1 closed. The remainder would not be sufficient to supply the remaining circuit parts of the IC with enough energy. If the supply voltage drops below a predetermined value, the control circuit REG prevents the switch T1 from being closed or remaining closed by not passing the measurement cycle signal MOD to the switch T1.

Figure 2:
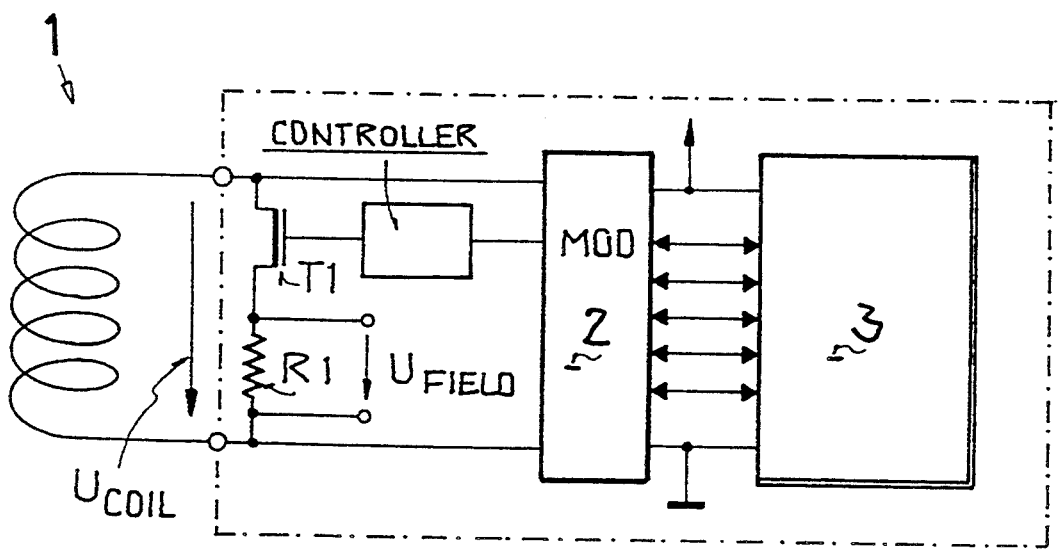
FIG. 2 shows the block diagram of a first embodiment in accordance with the invention.
Figure 3:
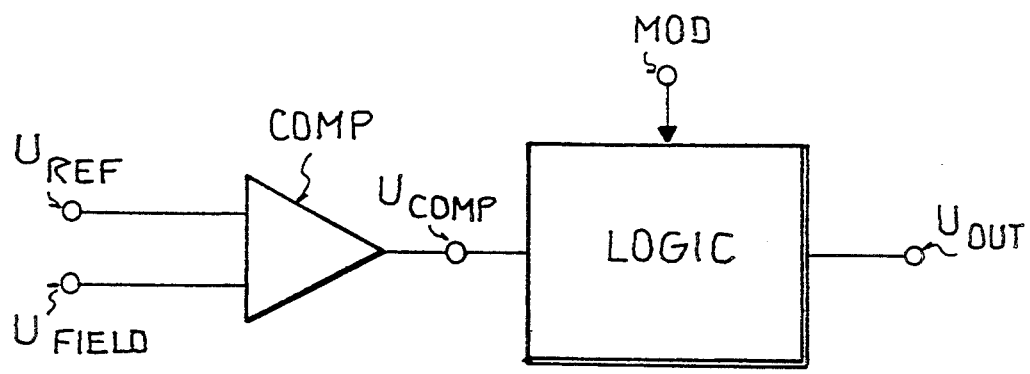
FIG. 3 shows a first evaluation circuit in accordance with the invention.

The voltage drop along the load R1 is used as the field strength-dependent potential $U_{FIELD}$ in the embodiment in accordance with FIG. 2. The field strength-dependent potential $U_{FIELD}$ is supplied to circuit parts as shown for example in FIGS. 3 and 4 for evaluation. The evaluation circuit in accordance with FIG. 3 comprises a comparator to compare the input signal $U_{FIELD}$ with a reference voltage $U_{REF}$. The result of the comparison $U_{COMP}$ is supplied to a logic stage and linked there with the measurement cycle signal MOD, since the output signal of the comparator is only meaningful when the switch T1 has been closed by the measurement cycle signal MOD. The final output signal $U_{OUT}$ of the logic stage is a binary signal indicating whether the field strength-dependent potential in the last measurement was greater than the reference voltage $U_{REF}$. With a suitable selection of the reference voltage, the output signal $U_{OUT}$ is a reliable measure of whether the received energy quantity is sufficient for implementing the energy-intensive functions of the user part. These functions are controlled in accordance with this output signal.

Figure 4:
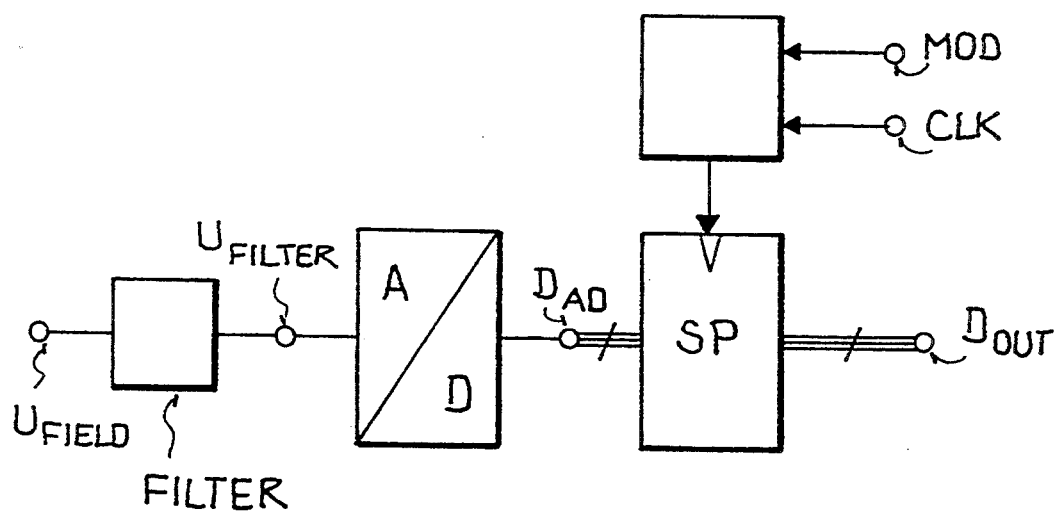
FIG. 4 shows a second evaluation circuit in accordance with the invention.
Figure 5A:
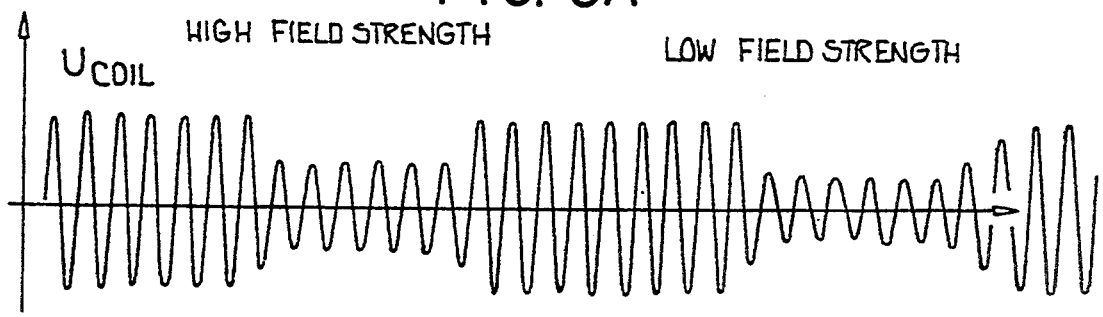
FIG. 5 shows the example of a signal curve in a circuit in accordance with the invention.
Figure 5B:
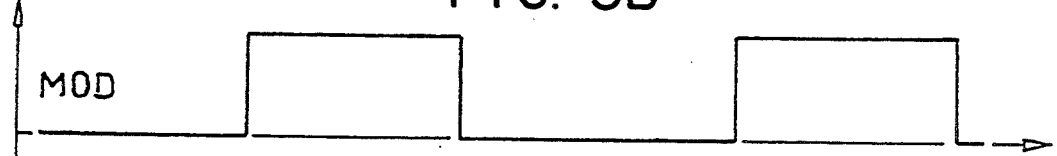
Figure 5C:
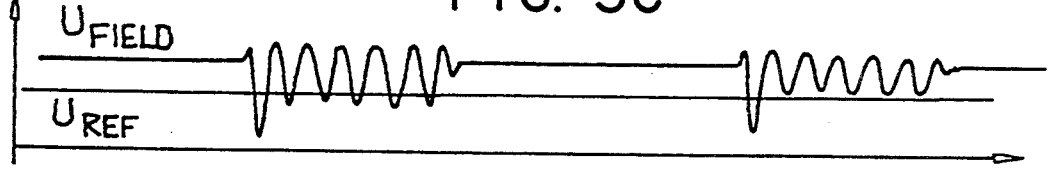
Figure 5D:
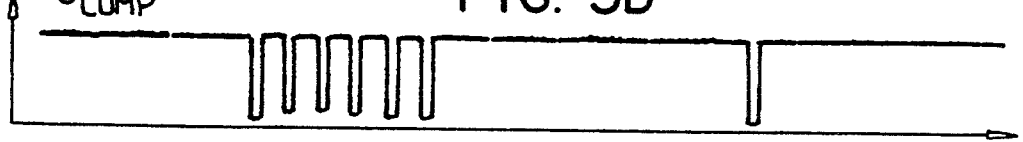
Figure 5E:
Figure 5F:
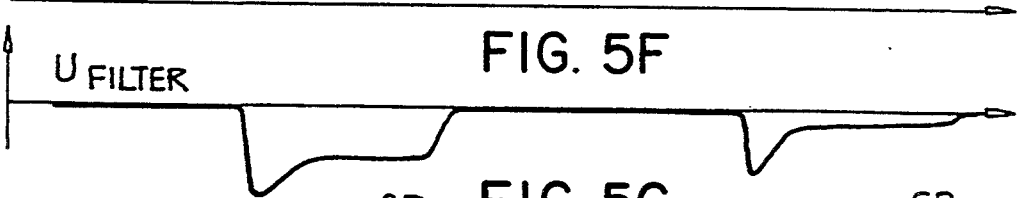
Figure 5G:
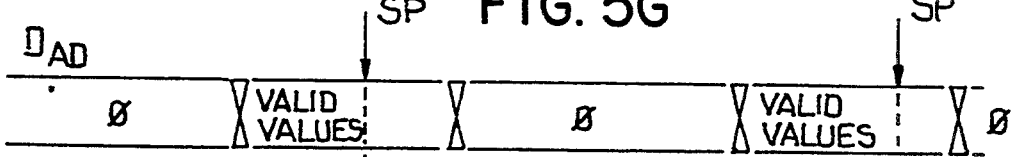
Figure 5H:

In the evaluation circuit according to FIG. 4, the field strength-dependent potential $U_{FIELD}$ is processed in digitized form. To do so, the field strength-dependent potential $U_{FIELD}$ is first passed to a filter stage and smoothed by the latter. Then the smoothed signal is digitized by an A/D converter. The bit resolution of the digitizing operation depends on the required precision of the digital output signal $D_{OUT}$. The output of the A/D converter is connected via suitably wide bus lines to a memory latch SP. The input of the memory SP is controlled using a clock signal CLK and a measurement cycle signal MOD. This ensures that the result of the A/D conversion is only written into the memory latch when the switch T1 is closed and hence the field strength-dependent potential $U_{FIELD}$ is meaningful. At the output of the memory latch SP the digitized output signal $D_{OUT}$ can be read out for further processing.

In a second embodiment, it is not the voltage drop along the load that is used as the field strength-dependent potential $U_{FIELD}$, but the supply voltage VSS direct, generated by the transmission and reception stage 2, when the load is applied to the reception coil. An analog comparator is used to compare the supply voltage with a reference voltage source generated on the IC. The analog comparator is, as already described above, triggered by the measurement cycle signal MOD and only switched on during the measurement proper. As a result, the entire induced current is available to the IC as working current outside the measurement cycles.

FIG. 5 shows the signal curves during field strength measurement for a high field strength in the left-hand part and a low field strength in the right-hand part of the graphs. The curves A, B and C show the timing of the coil voltage $U_{COIL}$, of the measurement cycle signal MOD and of the field strength-dependent potential $U_{FIELD}$ along the load R1. In the curve C, the reference voltage $U_{REF}$ supplied to the comparator is additionally plotted. The curve D shows the output signal of the comparator in accordance with FIG. 3, while curve E is the result of the field strength measurement $U_{OUT}$ at the output of the logic circuit. The curves F, G and H show the signal during digital signal evaluation according to FIG. 4. Curve F shows the smoothed output voltage of the filter, and curve H the output word of the A/D converter, the values of which only have validity during the measurement cycle signal. The point in time marked by the arrow and SP decides which value is written into the memory latch and can be read out from there (curve H).

The two evaluation types can also be used when it is not the voltage drop along the load, but the supply voltage VSS which is used as the field strength-dependent potential.

Furthermore, the invention is not restricted to chip cards; it can also be used to advantage for all batteryless and contactless IC applications, for example in identification systems.

What is claimed is:

1. A contactless and batteryless chip card having an antenna coil,
 a transmission and reception stage which via an electromagnetic alternating field generated by a write/read unit supplies the chip card with energy and ensures bidirectional data transmission to the write/read unit,
 a functional circuit part having a function which is dependent on an application of the chip card, and
 a detector for determining a field strength of said electromagnetic alternating field transmitting energy to said chip card, said detector having a switch and a load, said load being switched parallel to said coil by said switch for determining the field strength of the electromagnetic alternating field when a measurement cycle signal which is supplied to said switch is generated.

2. A chip card according to claim 1, wherein at least one function of said functional circuit part has a high energy requirement, and wherein the at least one function is only implemented when the detector has determined that said electromagnetic alternating field has sufficient field strength.

3. A chip card according to claim 2, wherein the at least one function having the high energy requirement includes writing into an EPROM or EEROM.

4. A chip card according to claim 1, wherein a voltage drop along the load when said load is switched parallel to said coil is used as a field strength-dependent potential for determining the field strength.

5. A chip card according to claim 4, wherein said field strength-dependent potential is compared with a reference voltage by a comparator circuit.

6. A chip card according to claim 5, wherein said comparator circuit is supplied with the measurement cycle signal, so that the output signal of said comparator is not valid unless said load is also switched parallel to said coil.

7. A chip card according to claim 4, wherein said field strength-dependent potential is digitized using an A/D converter and provided in digital form at an output of a memory latch for further digital processing.

8. A chip card according to claim 7, wherein said memory latch is supplied with said measurement cycle signal, such that the output value of said A/D converter is not written into said memory unless said load is also switched parallel to said coil.

9. A chip card according to claim 1, wherein a supply voltage supplied by said transmission and reception stage when said load is switched parallel to said coil is used as a field strength-dependent potential for determining the field strength.

10. A chip card according to claim 9, wherein said field strength-dependent potential is compared with a reference voltage by a comparator circuit.

11. A chip card according to claim 10, wherein said comparator circuit is supplied with the measurement cycle signal, so that the output signal of said comparator is not valid unless said load is also switched parallel to said coil.

12. A chip card according to claim 9, wherein said field strength-dependent potential is digitized using an A/D converter and provided in digital form at a output of a memory latch for further digital processing.

13. A chip card according to claim 12, wherein said memory latch is supplied with said measurement cycle signal, such that the output value of said A/D converter is not written into said memory latch unless said load is also switched parallel to said coil.

14. A chip card according to claim 1, wherein a result of said field strength measurement is passed on to said transmission and reception stage.

15. A chip card according to claim 14, wherein the result of said field strength measurement is transmitted to said write/read unit.

16. A chip card system having a chip card according to claim 15, wherein said write/read unit adjusts its transmission capacity to the result of said field strength measurement in said chip card, such that the field strength received by said chip card remains constant over a large distance range between said write/read unit and said chip card.

17. A chip card according to claim 14, wherein the result of said field strength measurement is transmitted to said functional circuit part.

* * * * *